Patented Mar. 26, 1946

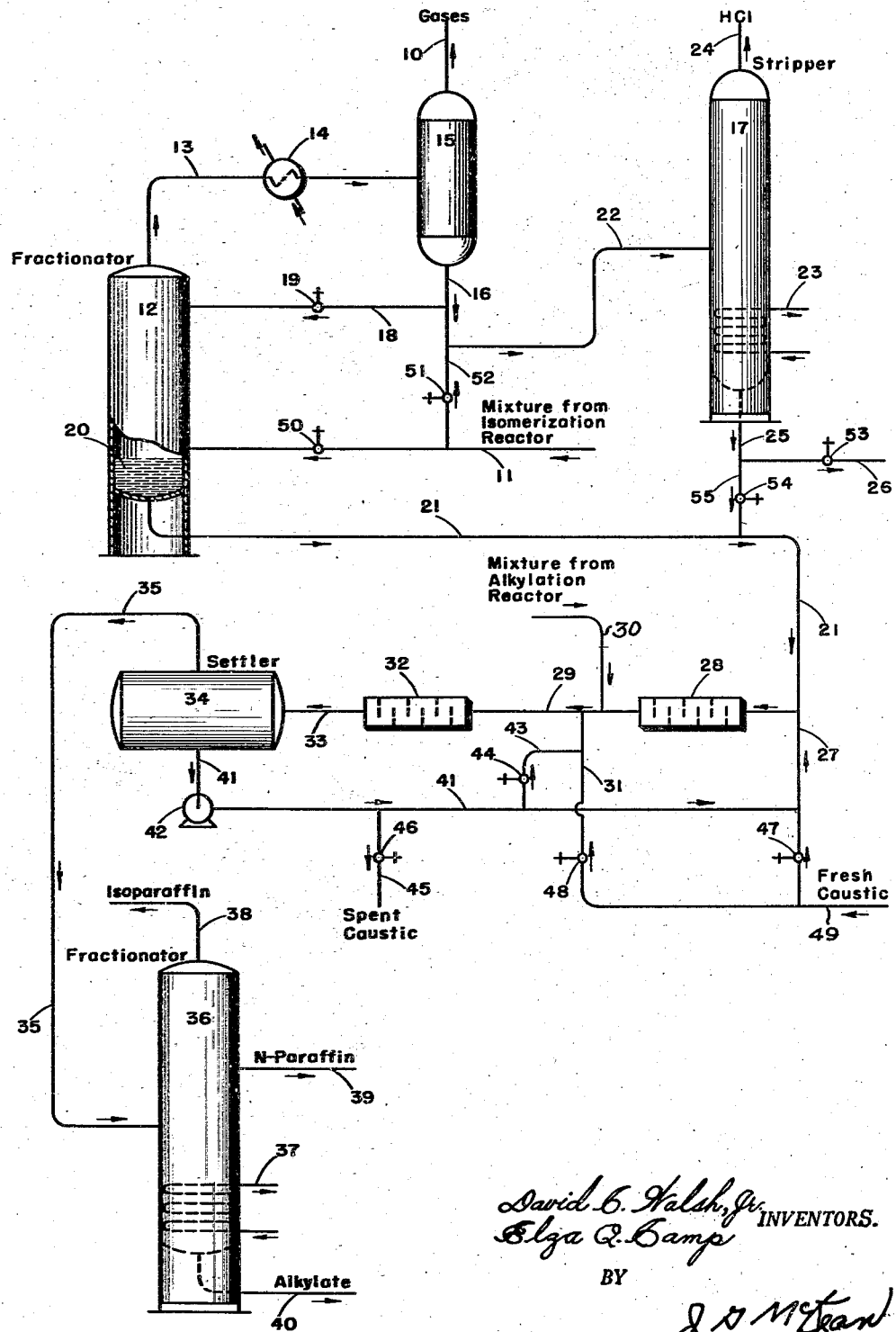

2,397,224

UNITED STATES PATENT OFFICE 2,397,224

TREATMENT OF HYDROCARBONS

David C. Walsh, Jr., and Elza Q. Camp, Goose Creek, Tex., assignors to Standard Oil Development Company, a corporation of Delaware Application December 2, 1943, Serial No. 512,582

7 Claims. (Cl. 196—41)

The present invention is concerned with a method for treating reaction products from catalytic conversion processes for removal of acidic material which cause corrosion on distillation of the reaction products. More particularly, the invention is concerned with the treatment with alkaline reagents of products resulting from the alkylation of isoparaffins with olefins and the isomerization of normal paraffin when acid-reacting materials are employed to catalyze these reactions.

In alkylation of isoparaffins with olefins, especially when concentrated sulfuric acid is employed to catalyze the reaction, there are formed alkyl sulfates which are soluble to some extent in the hydrocarbon product of the reaction. Some of the olefinic charge to the alkylation reaction is unreacted and, consequently, also leaves the reaction system in the hydrocarbons. Besides these contaminants the hydrocarbon product from the alkylation reaction has also been found to contain some $SO_2$. The alkyl sulfates resulting from the reaction have been observed to break down at the temperatures of distillation of the product to form corrosive materials.

In the isomerization processes employing metal halides as catalysts and promoted by hydrogen halides the product has been found to contain appreciable quantities of both the metal halides and the hydrogen halides. The hydrogen halide is easily recoverable from the hydrocarbon product by distillation, and it is economically desirable to recover the hydrogen halide promoter in the isomerization process. The metal halide due to its volatilizable nature is carried over from the isomerization reactor with the isomerized product and its recovery for reuse or removal poses a considerable problem. This carry-over of volatilizable metal halide is undesirable since the volatilizable metal halide on cooling of the hydrocarbon product condenses and solidifies in the auxiliary equipment usually associated with isomerization reactions. Thus the auxiliary equipment, such as condensers, coolers and fractionating towers, ultimately become plugged with the deposited metal halide. Furthermore, the carry-out of the volatilizable metal halide results in a condition which ultimately will cause the equipment to be impaired by corrosion to the extent that it no longer can be utilized.

Most isomerization and alkylation processes are operated in conjunction with each other. Thus the alkylation process requires isoparaffins for reaction with the olefins and the isomerization process is employed to produce the isoparaffins. It is often desirable to utilize one distillation system for processing of the reaction products from the two operations. In many cases it is desirable to combine the reaction product from the isomerization reaction with the reaction product from the alkylation reaction, free them from acidic reaction products, and then to distill them in one distillation system as mentioned.

However, when the reaction products from an isomerization and alkylation process employing, respectively, aluminum chloride and sulfuric acid as catalysts, were combined, caustic and water washed, and subsequently distilled, it was found that the distillation equipment suffered a considerable amount of corrosion due to acidic material being formed at the temperatures employed in the distillation system. It was established that the corrosive materials being formed were produced as a result of decomposition of acidic forming bodies that were not removed in the caustic and water washing step mentioned before.

It is, therefore, the main object of the present invention to provide a process whereby the hydrocarbon reaction products from an alkylation and isomerization process, employing, respectively, aluminum chloride and sulfuric acid as catalyst, may be treated with an alkaline reagent and distilled without corrosion of the distillation equipment.

In the present invention formation of reaction products which decompose at the temperatures employed in the distillation step of this process is prevented by treating the combined isomerized and alkylated product with alkaline reagents in a particular and critical sequence of steps. This particular series of steps includes treatment of the isomerized product containing the dissolved metal halide with an alkaline reagent prior to mixing with the alkylated product. The combined streams are then subjected to further treatment with alkaline reagent, the alkaline reagent removed and the hydrocarbon mixture subjected to distillation. When operating in accordance with the present invention the distillation equipment is not affected, and the hydrocarbon fractions from the distillation equipment are found to be free of the materials which ordinarily cause corrosion.

The reason for the unexpected result achieved by operating in accordance with the present invention is not completely understood, but it is believed that in the conventional operation the aluminum chloride and hydrogen chloride promoter contained in the isomerization product stream react with alkyl sulfates and/or residual unsaturated hydrocarbons remaining in the alkylated product. It is believed that these reaction products are organic halides and in the present case they are believed to be alkyl halides. When a stream containing these organic chlorides was subjected to the temperature encountered in the distillation of the alkylate-containing stream they suffered decomposition reactions whereby hydrochloric acid and sulfur dioxide were released, which, in conjunction with water usually associated with these streams, caused an extremely corrosive condition to exist in the overhead distillation equipment.

For a more specific description of the present invention reference is made to the single figure, which is a diagrammatic flow plan of one embodiment according to the invention.

Referring to the drawing in detail, numeral 11 designates a flow line carrying isomerization product from an isomerization reactor in which a paraffin hydrocarbon is isomerized in the presence of a promoter and a volatilizable metal halide deposited on a carrier. The isomerized product in line 11 is injected thereby into fractionator 12, which in the present case is a distillation tower in which a separation is made between the hydrocarbons and the metal halide. The conditions of fractionator 12 are such that only a crude separation between the hydrocarbon and the metal halide is made. Thus only a sufficient amount of reflux is introduced to fractionator 12 so that the metal halide remains as a bottoms fraction in the fractionator, amounting to between 2 and 20% of the isomerized product introduced thereto by line 11. A more complete description of the function of fractionator 12 will be found in pending application, U. S. Serial No. 488,124, filed May 24, 1943, for William B. Franklin. The process described and claimed in the aforementioned application does not form a part of this invention, but the present invention may be more easily understood by reference to the fractionator 12.

Ordinarily in the aforementioned pending application the metal halide remaining as a bottoms fraction in the fractionator 12 is recycled to the isomerization reactor. However, quite frequently the metal halide fraction becomes fouled with heavy hydrocarbons and tarry reaction products which make it unsuitable for return to the isomerization reactor as described in U. S. Serial No. 488,124. It is in the cases when the residual liquid contains undesirable components for inclusion in the isomerization reactor that the present invention is practiced in conjunction with fractionator 12.

As mentioned before conditions are adjusted in fractionator 12 so that the hydrocarbons are substantially removed from the metal halide contained in the isomerized product. The hydrocarbons are removed from fractionator 12 through line 13, pass through a condenser 14 into an accumulator 15, from the bottom of which liquefied product is carried by line 16 to a hydrogen chloride stripper 17. Line 16 is provided with a branch line 18, controlled by valve 19, which permits the return of a selected amount of the liquefied product to the top of fractionator 12 to pass downwardly countercurrently to the vaporous product ascending therein. A liquefied residue 20, which contains substantially all of the metal halide contained in the isomerized product, forms at the bottom of fractionator 12 and discharges therefrom by line 21 to be handled, as will be described further.

The liquefied product from accumulator 15 passes, by line 16 and branch line 22, to hydrogen chloride stripper 17 which is provided with heating means 23 for adjustment of temperature therein, while uncondensed gases are removed through line 18. Conditions in hydrogen chloride stripper 17 are such that hydrogen chloride and light hydrocarbons are removed therefrom by way of line 24. Separation between the hydrogen chloride and the light hydrocarbons is not shown herein since this separation does not form part of the present invention. In any event the hydrogen chloride after separation from the light hydrocarbons may be recycled to the isomerization stage from which the isomerized product in line 11 originates. The isomerized product, substantially free from hydrogen chloride, discharges from hydrogen chloride stripper 17 by way of lines 25 and 26 for further distillation for separation of the isoparaffin from the normal paraffin.

The liquefied residue 20, withdrawn from fractionator 12 by way of line 21, discharges into line 27 where it is intermingled with an alkaline reagent. The mixture of alkaline reagent, metal halide and hydrocarbons from lines 21 and 27 are intimately contacted in mixing means 28 and discharged therefrom by way of line 29 to which is introduced, by way of line 30, an alkylated product resulting from the alkylation of an isoparaffin with an olefin in the presence of strong sulfuric acid as the catalyst. The mixture of isomerized product, alkaline reagent and alkylated product is then further treated by addition of additional amounts of alkaline reagent through line 31. The combined streams then pass to mixing device 32 in which the mixture is intimately contacted and passes thence by way of line 33 to settler 34 which is of sufficient capacity to allow separation by gravity between the hydrocarbon and alkaline phases. After the hydrocarbons have separated from the alkaline reagent, they are withdrawn from settler 34 by way of line 35 and are introduced thereby into fractionator 36 which is provided with heating means 37 for adjustment of temperature and pressure conditions.

Fractionator 36, it is understood, may comprise one or more distillation towers as desired. In this particular instance fractionator 36 is shown to be a single distillation tower with line 38 for withdrawal of isoparaffin as an overhead fraction, line 39 for segregation of a normal paraffin fraction as a side stream and line 40 for withdrawal of an alkylate stream as a bottoms fraction.

It is in fractionator 36 and lines 38, 39 and 40 that the corrosion troubles mentioned hereinbefore were encountered when operating according to conventional practice. In the present invention the corrosion difficulties are substantially avoided.

The alkaline phase separated in settler 34 discharges therefrom by way of line 41 and is injected by pump 42 into line 27 whereby the residual liquid from fractionator 12 is treated. Line 41 is provided with a branch line 43, controlled by valve 44, whereby a portion, or all, of the alkaline reagent withdrawn by line 41 from settler 34 may be diverted to treat the mixture in line 29. Preferably, however, the alkaline reagent withdrawn from settler 34 is employed to treat the residual liquid 20 from fractionator 12 in the manner described.

From time to time the alkaline reagent withdrawn from settler 34 by line 41 will be decreased in alkalinity to a point where it no longer functions effectively in removing acidic materials from the streams flowing through lines 29 and 30. In those cases a portion of the alkaline reagent is discarded from the system through line 45 by opening valve 46 located therein.

When spent alkaline reagent is discarded from the system through line 45 it will be necessary to add an amount of fresh alkaline reagent to maintain the strength at the optimum level. This can be accomplished by either of two ways. Thus fresh alkaline reagent may be introduced into either line 27 or line 29 by opening either valve 47 in line 27 or valve 48 in line 31, the fresh alkaline reagent being introduced from a source not shown by way of line 49.

As an alternate method of operation, in some particular cases it may be desirable to bypass completely fractionator 12. In these instances valve 50 in line 11 will be closed and valve 51 in line 52 will be opened, and the isomerized product delivered directly to hydrogen chloride stripper 17 without the preliminary fractionation for concentration of metal halide. When operating in accordance with the alternate method, valve 53 in line 26 is closed and valve 54 in line 55 opened allowing delivery of the hydrogen chloride stripped hydrocarbons to line 21. Thereafter the operation is substantially as described in the preferred embodiment.

It is obvious to the skilled worker that the alternate operation requires processing of larger quantities of hydrocarbon than in the preferred embodiment.

The seriousness of the problem solved by the present invention will be illustrated by the analysis of the water condensed with the overhead stream from fractionator 36 prior to operating in accordance with the method described herein. When the residual liquid 20 from fractionator 12 was mixed with the alkylated product introduced by line 30 into the mixture and caustic washed, the water condensed with the overhead stream from fractionator 36 had a pH of 3.2 and contained about 17,000 P. P. M. of chlorides, which is an extremely corrosive condition. When operating in accordance with the present invention with the dual-caustic treating step and with careful control of the amount of caustic used, the water condensed with the overhead stream contained a negligible amount of chlorides and had a high pH value. Analysis of the alkylate discharged by way of line 40 when operating in accordance with the present invention showed only traces of organic chloride.

The amount of caustic employed to treat the residual liquid 20 from fractionator 12 will vary depending upon the strength of alkaline reagent employed and the amount of residual liquid formed. However, with a residual liquid from fractionator 12 amounting to 500 gallons per hour good results were obtained with a total alkaline treat of between 4,000 and 5,000 gallons per hour of alkaline reagent of about 10° Bé., which in this case was a sodium hydroxide solution. It will be obvious to the persons skilled in the art that the amount of alkaline reagent employed may vary widely. It is good practice to employ a sufficient amount of alkaline reagent to neutralize completely the acidity in both the isomerized and alkylated product streams.

The nature and objects of the present invention having been fully described and illustrated, what we wish to claim as new and useful and to secure by Letters Patent is:

1. In a process for the treatment with an alkali metal hydroxide of the combined product from an isomerization stage and an alkylation stage in which the isomerization stage is catalyzed with a metal halide and the alkylation stage is catalyzed with a mineral acid the steps of admixing product from the isomerization stage with a solution of an alkali metal hydroxide, adding alkylated product to the mixture of a solution of an alkali metal hydroxide and isomerized product, treating the resulting mixture with additional amounts of a solution of an alkali metal hydroxide, settling to obtain a hydrocarbon phase and distilling the resulting hydrocarbon phase.

2. In a process for the treatment with a solution of an alkali metal hydroxide of the combined product from an isomerization and alkylation process in which the isomerization stage is catalyzed with a metal halide and the alkylation stage of the process is catalyzed with a strong mineral acid the steps of subjecting isomerized product to a distillation to obtain a fraction in which the metal halide is concentrated, treating the metal halide-containing fraction with a solution of an alkali metal hydroxide, adding to the resulting mixture alkylated product, subjecting the resulting mixture to treatment with additional amounts of a solution of an alkali metal hydroxide, settling the treated mixture of isomerized and alkylated product to obtain alkaline and hydrocarbon layers, separating the alkaline layer from the hydrocarbon layer, and distilling the hydrocarbon layer.

3. A process in accordance with claim 2 in which the separated alkaline layer is employed to treat the metal halide-containing fraction.

4. A process in accordance with claim 2 in which the separated alkaline layer is divided into two portions, one is added to the metal halide-containing fraction and the other to the mixture of treated metal halide-containing fraction and alkylate.

5. In a process for treating the combined products from an isomerization and alkylation process in which the isomerization is catalyzed by aluminum chloride and the alkylation by strong sulfuric acid whereby the products are recovered free from inorganic and organic chlorides the steps of distilling the product from the isomerization to obtain a concentrate of metal halide in hydrocarbons, treating the concentrate with a caustic reagent, admixing the treated concentrate with product from the alkylation, subjecting the resulting mixture to treatment with additional amounts of alkaline reagent, settling the treated mixture to obtain hydrocarbon and caustic reagent phases, withdrawing the caustic reagent phase and distilling the hydrocarbon phase to obtain products substantially free of chlorides.

6. A process in accordance with claim 5 in which the caustic phase is employed to treat the metal halide concentrate.

7. In a process for the treatment with a solution of an alkali metal hydroxide of the combined product from an isomerization and an alkylation process in which the isomerization stage is catalyzed with a metal halide and the alkylation of hydrocarbons in an alkylation stage is catalyzed with a mineral acid, the steps of treating product from the isomerization stage with a solution of an alkali metal hydroxide, adding product from the alkylation stage to the treated isomerization product to form an admixture, treating the resulting admixture with a solution of an alkali metal hydroxide and subsequently distilling to separate a hydrocarbon fraction.

DAVID C. WALSH, Jr.
ELZA Q. CAMP.